Jan. 4, 1949.                G. A. LYON                2,458,491
                             WHEEL COVER
                          Filed Jan. 8, 1945

Inventor
GEORGE ALBERT LYON
The Firm of Charles W. Hills
by                                           Attys.

Patented Jan. 4, 1949

2,458,491

UNITED STATES PATENT OFFICE 2,458,491

WHEEL COVER

George Albert Lyon, Allenhurst, N. J.

Application January 8, 1945, Serial No. 571,851

4 Claims. (Cl. 301—37)

This invention relates to an ornamental wheel structure and more particularly to a cover or trim for an automobile wheel.

An object of this invention is to provide an improved and simplified cover which may be made of relatively thin metal and yet have sufficient reinforcement to enable it to maintain its shape and position on a wheel.

Still another object of this invention resides in the provision of an improved wheel cover structure adapted to be held on a wheel by a hub cap clamped into engagement therewith and of a contour such that a radially outer portion of the cover, when in use, appears to be a continuation of the side wall of a tire.

Yet another object of the invention relates to the provision of a metallic cover which will better accommodate manufacturing variations in the parts of a wheel such as the so-called wheel tire rim and body parts.

Another and further object of the invention relates to the provision of a wheel cover which may be temporarily retained on a wheel by hub cap retaining elements and at least until such time as the hub cap is pressed into clamping engagement with the cover.

In accordance with the general features of this invention, there is provided a wheel cover comprising an annulus of thin metallic sheet and including radially inner and outer concentric sections extending in generally divergent d'rections from their junction, the cover being provided with a reinforcing ornamental bead on the outer side of the same and which is retainingly held between the sections at the junction point.

Another feature of the invention relates to the forming of an outer section of the aforesaid cover of such width and curved configuration as to appear, in use, on a wheel to be a continuation of the side wall of a tire.

Yet another feature of the invention relates to the provision in the aforesaid cover of a turned inner margin arranged to be engaged by hub cap retaining elements on a wheel for temporary retention on a wheel and until such time as the hub cap is clamped thereagainst, the inner margin being deflectable by the hub cap for adjustable engagement with the body part of the wheel.

Figure 2:
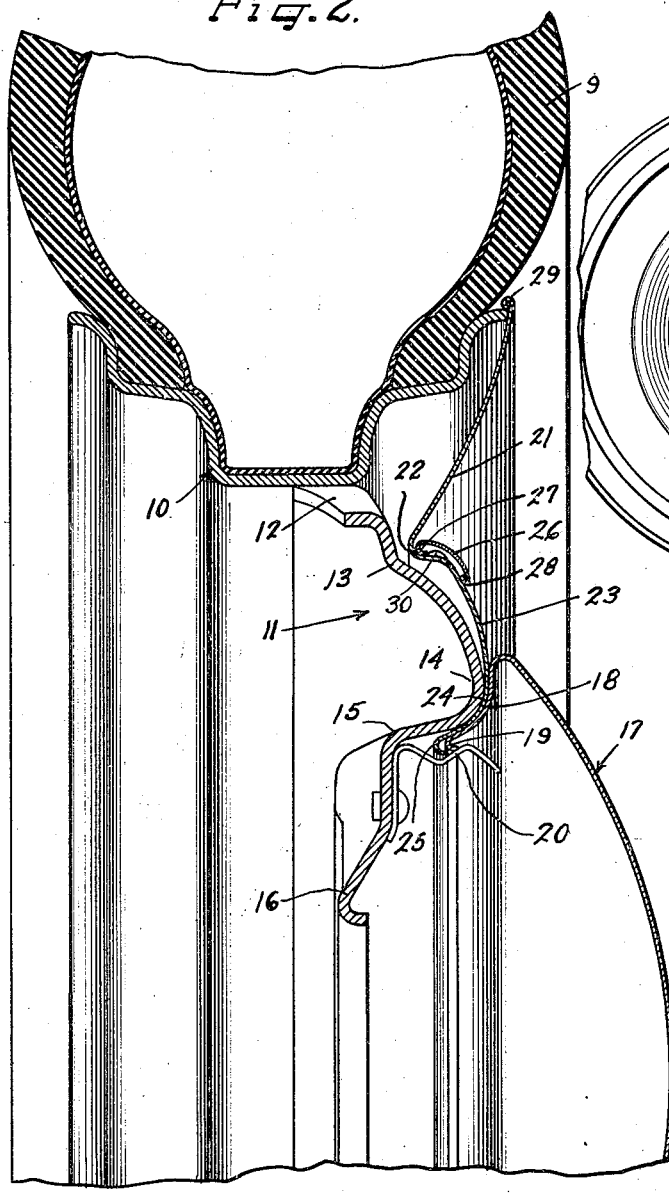
Figure 1:
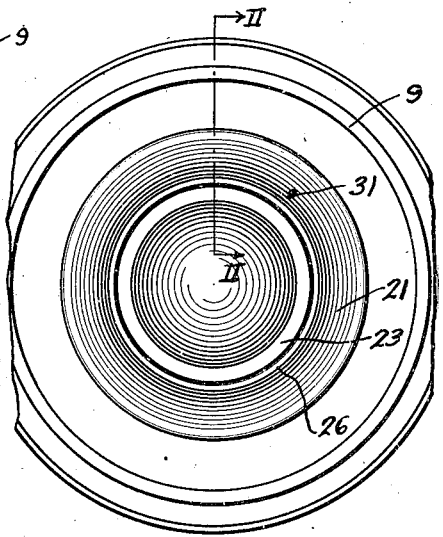
Figure 3:
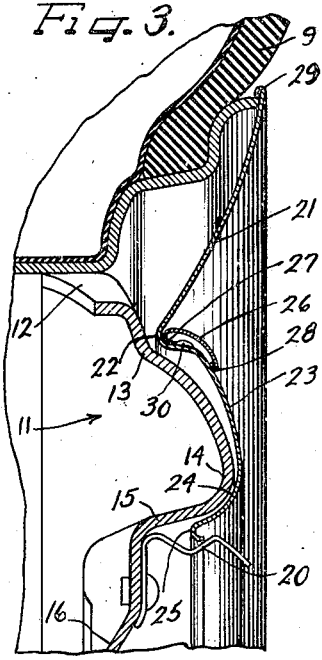

Other objects and features of the invention will more fully appear from the following detailed description taken in connection with the accompanying drawings which illustrate a single embodiment thereof, and in which Figure 1 is a fragmentary side view of a wheel structure having applied thereto the cover of my invention;

Figure 2 is an enlarged fragmentary cross sectional view taken on substantially the line II—II of Figure 1, looking in the direction indicated by the arrows; and Figure 3 is a fragmentary sectional view similar to Figure 2 with the hub cap removed and showing the position of the inner margin of the cover prior to deflection by the hub cap.

As shown on the drawings:

The reference character 9 designates generally a conventional type of pneumatic tire and tube received in the usual way by a multi-flange tire rim 10 of the so-called drop center type.

The tire rim 10 constitutes one part of a wheel, the other principal part being the body or spider part designated generally by the reference character 11, and which is attached at spaced intervals in the usual way to the base flange of the tire rim leaving transverse wheel openings 12 alternating with the points of attachment.

The body part 11 comprises a dished or shell-like metallic stamping and includes an indentation 13 adjacent the openings 12, a curved outer nose portion 14, a rearwardly depressed central portion 15 and a fastening flange 16. This fastening flange, as is well known in the art, may be provided with the usual spaced apertures for receiving bolts or cap screws usually employed in attaching the wheel to a part on an automobile axle (not shown).

Located in the central recessed portion 15 of the body part is the usual hub cap 17 which must be removable in order to afford access to the conventional wheel bolts (not shown). This hub cap may be made of any suitable material, such as sheet metal and includes a rearwardly and under-turned skirt 18, terminating in a turned circular edge 19 adapted to be cammed over and into retaining cooperation with the usual hub cap retaining elements or spring clips 20. These clips 20 may be made of any su'table number, such for example, as three or five, and are fastened by any suitable means to the flat flange 16 of the body part.

The free extremity of each of the clips 20 is humped in the usual way so as to require camming of the rear edge 19 of the cap thereover into retained cooperation therewith. This structure permits of the hub cap going on the wheel much easier than it is to remove it. As a consequence, it is customary in removing such hub cap to employ a suitable pry-off tool (not shown) for forcibly prying the hub cap free of the retaining spring clips.

The wheel structure that I have thus far described is substantially of a conventional construction and is illustrated in many patents that have heretofore been granted in the wheel art. My invention is particularly concerned with the provision of a novel wheel cover or trim for this wheel structure.

As best shown in Figure 2, the annular wheel trim of my invention comprises radially inner and outer concentric sections 21 and 23, which generally extend in divergent directions from their junction point 22. This cover may be made of any suitable material although I preferably make it of very thin sheet steel, such as for example, steel sheet of .018 to .020 in thickness.

The inner radial section 23 is of a curved channeled cross-sectional contour and has an axially rearwardly turned curved portion 24 closely following the outer surface of the nose 14 of the body part and terminating inside of the central portion 15 in a turned edge 25. This turned edge is of such diameter that it may be cammed over the humps of the spring clips 20 prior to the application of the hub cap and so that the wheel cover will be temporarily held on the wheel leaving both hands of the operator free to apply the hub cap.

In addition, the inner portion 24 of the cover, as best shown in Figure 3, is spaced from the body part of the wheel so as to require deflection in order for it to be pressed home against the body part of the wheel. This is a very desirable feature in that it enables the cover to accommodate manufacturing variations in the rim and body parts of the wheel. For example, these variations may be such that in a given set of wheels the outer surface of the body part portion 24 may be located in different positions relative to the outer edge of the rim 10. This means that if the cover is to bear at two points, it must be capable of some deflection in order to allow for variations in the relative locations of these portions of the wheel.

Inasmuch as the radially inner portion or section of the cover is resiliently deflectable upon pressure thereagainst by the hub cap and since the cover is made of very thin material, I find it desirable to reinforce the cover. To that end I have provided a unique and yet inexpensive way of rigidifying the cover while at the same time ornamenting the same.

The aforesaid rigidification is accomplished by disposing an annular metallic bead 26 on the outer side of the cover at the junction point 22. This bead 26 is of a curved or channeled cross-sectional contour and has turned inner and outer edges 27 and 28. The outer turned edge 27 is adapted to be cammed over and behind a plurality of spaced retaining protuberances 30 formed on the outer portion of the cover section 23.

These protuberances face radially outwardly and are arranged in a common circle such that in order for the bead edge 27 to be disposed in abutment with the junction point 22, this edge must be sprung or cammed over the outer surfaces of the protuberances. When in final position the bead has both of its edges bearing against the cover so as to be firmly retained under tension against the same. In addition, by reason of the location of this bead with its radially outer edge substantially bottomed at the junction point 22, which in itself comprises an annular shoulder, greater rigidity is provided for the cover tending to resist permanent distortion of the same when deflected.

I also find it advantageous to turn or curl the outer edge of section 21 as indicated at 29 and so as to slightly overhang the outer edge of the rim adjacent the side wall of the tire 9.

This cover of my invention by reason of its construction lends itself admirably to many different and highly pleasing ornamental effects. For illustration, the outer section may have its external surface finished in white, in which event this section by reason of its inclination and depth will appear to constitute a white side wall part of the tire 9. This is accomplished by the location of the outer edge 29 of the cover being in close proximity to the tire and by the section 21 being curved radially and axially inwardly to the point 22 directly over the indentation 13. As a consequence of this arrangement the cover when on a wheel causes the wheel to appear to have a massive tire which extends clear down to a point in close proximity to the outer edge of the hub cap 17.

In addition to the foregoing, the outer surface of the bead 26 may be given a highly lustrous finish. This may be easily accomplished if the bead, for example, is made of stainless steel.

Also the exposed outer surface of the portion 23 may be given a contrasting color finish. Excellent results may be attained, for example, by giving this portion the same color as is employed on the body of the vehicle. On the other hand, the hub cap may have the usual lustrous external finish if the same is so desired.

The foregoing application of finishes and colors have been found to provide a very highly pleasing ornametal effect which greatly enhances the appearance of what is otherwise a drab appearing wheel.

While the cover of my invention has certain highly ornamental features, it will also be perceived that it has rigidifying and adjustable characteristics of great utility in the wheel cover field.

I claim as my invention:

1. In combination in a wheel cover adapted to be applied to the outer side of a vehicle wheel comprising a tire rim and a load sustaining body portion, radially inner and outer concentric cover sections formed in one piece and extending in generally divergent directions from their junction, the outer of said sections being adapted to cover the tire rim and having a convex generally tire side wall simulating shape and the inner of said sections being adapted to lie in body concealing relationship, the junction between said sections providing a generally axially outwardly opening groove defined at its inner section side by a generally radially outwardly facing shoulder, radially outwardly protruding trim retaining protrusions on said shoulder, and a reinforcing and ornamental bead structure having a turned edge extending substantially to the root of said groove and being retained by said protrusions in snap-on relationship.

2. In a cover structure for a wheel including multi-flange tire rim and body parts and a hub cap detachably retained in a central recess of the body part, a wheel cover of thin metallic sheet comprising concentric channeled sections formed in one piece and extending from their junction point in generally divergent directions, the radially outer section extending radially and axially inwardly from the rim part to said junction point over the wheel body part and an inner section extending generally radially inward over the body part and having an inner margin turned axially rearwardly into said body part recess for retaining cooperation with the wheel hub cap, the outer margin of the inner section having a generally radially outwardly facing shoulder, and a circular member having a generally radially outwardly and axially inwardly extending margin retainingly engaging said shoulder with the body portion of the member extending generally radially inwardly over said inner section.

3. In a cover structure for a wheel including multi-flange tire rim and body parts and a hub cap detachably retained in a central recess of the body part, a wheel cover of thin metallic sheet comprising concentric channeled sections formed in one piece and extending from their junction point in generally divergent directions, the radially outer section extending radially and axially inwardly from the rim part to said junction point over the wheel body part and an inner section extending generally radially inward over the body part and having an inner margin turned axially rearwardly into said body part recess for retaining cooperation with the wheel hub cap, the outer margin of the inner section having a generally radially outwardly facing shoulder, and a circular member having a generally radially outwardly and axially inwardly extending margin retainingly engaging said shoulder with the body portion of the member extending generally radially inwardly over said inner section, said shoulder having a plurality of retaining elements extending therefrom and engaged by said outer margin of said member.

4. In a wheel structure including a tire rim and body parts, said body part having a dished central portion including hub cap retaining clips, a one piece cover member having divergently related annular portions including a junction groove opening generally axially outwardly, the outer annular cover portion being disposed over the tire rim and the inner cover portion being disposed over the body part and having its inner edge adjacent to said retaining clips, a hub cap engaging in snap-on relation with said clips and clamping said inner cover portion to the body part, and a reinforcing bead secured in said juction groove with its outer edge bottomed therein.

GEORGE ALBERT LYON.

REFERENCES CITED

The following references are of record in the file of this patent:

UNITED STATES PATENTS

| Number | Name | Date |
|---|---|---|
| Re. 21,179 | Lyon | Aug. 22, 1939 |
| Re. 22,042 | Lyon | Mar. 3, 1942 |
| 2,107,015 | Short | Feb. 1, 1938 |
| 2,158,126 | Horn | May 16, 1939 |
| 2,212,037 | Lyon | Aug. 20, 1940 |
| 2,298,669 | Wood | Oct. 13, 1942 |
| 2,317,393 | Lyon | Apr. 27, 1943 |
| 2,368,232 | Aske | Jan. 30, 1945 |